United States Patent [19]

Hashimoto

[11] Patent Number: 4,643,788
[45] Date of Patent: Feb. 17, 1987

[54] PROCESS FOR PRODUCING A TUBULAR CASING

[75] Inventor: Tadashi Hashimoto, Nagahama, Japan

[73] Assignee: Mitsubishi Plastics Industries Limited, Tokyo, Japan

[21] Appl. No.: 719,512

[22] Filed: Apr. 3, 1985

[30] Foreign Application Priority Data

Apr. 26, 1984 [JP] Japan .................................. 59-84979

[51] Int. Cl.⁴ .............................................. B31D 3/04
[52] U.S. Cl. .................................. 156/203; 156/257; 264/130
[58] Field of Search ............... 493/272, 273, 275, 295, 493/328, 329, 397, 438, 455, 456, 399, 148, 153; 264/130, 285, 343; 156/257, 145, 203, 211, 268, 461

[56] References Cited

U.S. PATENT DOCUMENTS

| | | | |
|---|---|---|---|
| 2,041,974 | 5/1936 | Sloan | 156/211 X |
| 2,244,282 | 6/1941 | Bergstein | 493/148 X |
| 2,900,881 | 8/1959 | Barnes et al. | 493/272 |
| 4,242,161 | 12/1980 | Hultén et al. | 493/295 X |

*Primary Examiner*—David Simmons
*Attorney, Agent, or Firm*—Oblon, Fisher, Spivak, McClelland & Maier

[57] ABSTRACT

A process for producing a tubular casing by folding a flat plastic sheet (1) into a tubular structure by a shaping former (6) as the sheet advances, and joining the meeting edges of the folded sheet to form the tubular casing, characterized by forming grooves (13) on one or both sides of the sheet along fold lines, coating a surfactant (12) on the sheet surface at least at the fold line portions of the sheet surface which are to be brought into contact with the shaping former, and then folding the sheet into a tubular structure by the shaping former.

7 Claims, 6 Drawing Figures

PROCESS FOR PRODUCING A TUBULAR CASING

The present invention relates to a process for continuously producing a tubular casing by folding a flat plastic sheet.

As a process for producing a tubular casing by folding a flat plastic sheet, there has been known a process which comprises folding an advancing sheet along a shaping former to form a tubular structure, and then joining the meeting edges of the folded sheet. However, in this process, if the advancing speed of the sheet is increased to speed up the production rate and to thereby increase the production efficiency, it may happen that the sheet will be brought in frictional engagement with the shaping former whereby the sheet will have scratch marks or scars, or the resulting tubular casing tends to be deformed.

It is an object of the present invention to provide a process for efficiently producing a tubular casing having good outer appearance and dimensional stability from a flat plastic sheet. More particularly, the present invention is intended to provide a suitable process for producing a tubular casing to accommodate electronic devices such as integrated circuits, such as a tubular magazine B as shown in FIG. 6.

The present invention is based on a discovery of a process whereby the friction between the sheet and the shaping former can readily be minimized.

Namely, the present invention provides a process for a tubular casing by folding a flat plastic sheet (1) into a tubular structure by a shaping former (6) as the sheet advances, and joining the meeting edges of the folded sheet to form the tubular casing, characterized by forming grooves (13) on one or both sides of the sheet along fold lines, coating a surfactant (12) on the sheet surface at least at the fold line portions of the sheet surface which are to be brought into contact with the shaping former, and then folding the sheet into a tubular structure by the shaping former.

Now, the present invention will be described in detail with reference to the accompanying drawings.

In the present invention, as the plastic sheet, there may be employed a single or composite sheet made of a thermoplastic material such as polyvinyl chloride, polystyrene, polypropylene, polycarbonate or polyester.

The thickness of the sheet is determined by the size and the configuration of the tubular casing. However, the thickness is usually preferably from 0.1 to 2 mm from the viewpoints of efficient folding operation and the strength. The sheet itself may be transparent, translucent or colored, or it may be printed with letters or the like.

Figure 1:
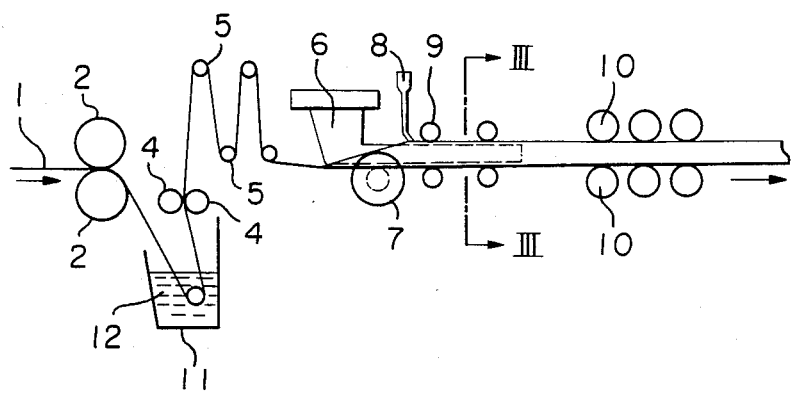
FIG. 1 is a front view illustrating one embodiment of the apparatus for carrying out the process of the present invention.

Now, the construction of the apparatus illustrated in FIG. 1 will be described. Firstly, grooves 13 to facilitate the folding operation (see FIG. 2) are formed along four fold lines on one side of a sheet 1 by means of foldline-forming rolls 2. The positions and the number of grooves are determined depending upon the configuration of the tubular casing. The cross-sectional shape of the grooves is substantially in a V-form or U-form, and the depth of the grooves is usually within a range of from 30 to 70% of the thickness of the sheet. If the depth is less than 30%, the folding operation will not be adequately facilitated. On the other hand, if the depth exceeds 70%, the strength tends to be inadequate. The grooves may be formed by any other method than the above mentioned foldline-forming rolls.

Figure 2:
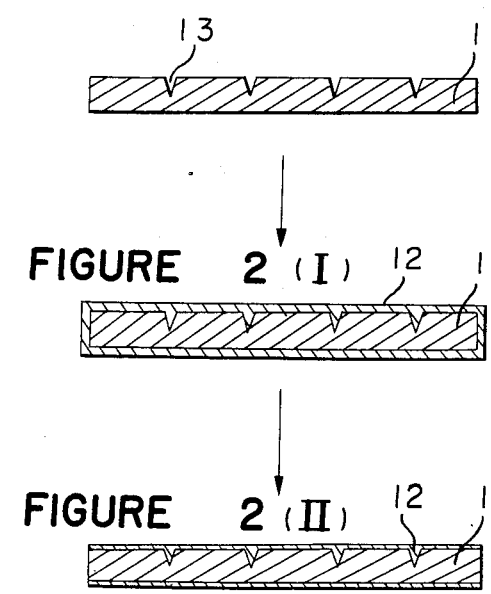
FIG. 2 illustrates in cross section the sequential steps for the application of a surfactant to a sheet having grooves, in the above apparatus.

The sheet provided with grooves 13 is then passed through a surfactant 12 in a tank 11 (i.e. a dipping method), whereby the surfactant 12 is applied onto the entire surface of the sheet, as shown by the cross-sectional view (I) of FIG. 2.

Various types of surfactants may be employed. For instance, there may employed anionic surfactants of e.g. alkylsulfate type, alkylarylsulfate type, alkylphosphate type or alkylaminesulfate type; cationic surfactants of e.g. quaternary ammonium salt type, quaternary ammonium resin type or imidazoline type; nonionic surfactants of e.g. sorbitan fatty acid ester type, monoglyceride type, polyoxyethylene alkylether type, polyoxyethylene alkylamine type or trialkylphosphate type; and amphoteric surfactants of e.g. betaine type or metal salt type.

Such surfactants have functions not only for providing lubrication properties to the coated surface but also for preventing the deposition of foreign matters on the tubular casing or the formation of static electricity. Namely, they provide so-called antistatic effects.

The above mentioned surfactant is dissolved in a solvent such as water, methyl alcohol, ethyl alcohol or a mixture of these solvents, and the viscosity is adjusted before coating to facilitate the operation. The surfactant is dissolved usually within a range of from 0.5 to 5 parts by weight relative to 100 parts by weight of the solvent.

Then, the sheet coated over the entire surface with the surfactant 12, is passed through nip rolls 4, whereby an excess amount of the surfactant is removed, and the surfactant 12 is retained at the grooves 3, as shown by the cross-sectional view (II) of FIG. 2.

Then, the sheet is passed over a plurality of drying rolls 5, whereby the surfactant-coated surface of the sheet is dried by a drying means such as hot air, and the solvent or the like is removed, but the surfactant remains wet in the grooves 13.

In the present invention, the application of the surfactant may be conducted by any other method than as described above, so long as the surfactant is applied at least at the grooves of the sheet which will be brought in contact with the shaping former 6 in the subsequent step. But the abovementioned dipping methods is most effective for sufficiently filling the grooves 13 with the surfactant 12.

Figure 3:
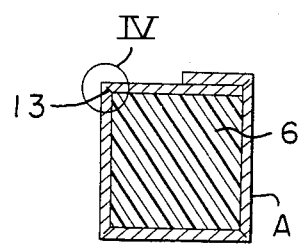
FIG. 3 is a cross-sectional view taken along line III—III in FIG. 1.

The sheet provided with the grooves 13 and coated with the surfactant, is then folded into a cross sectionally square tubular casing A as shown by the cross-sectional view of FIG. 3 by means of the shaping former 6, shaping roll 7 and supporting roll 9. During this process, the meeting edges of the sheet are securely bonded by an adhesive supplied from an adhesive nozzle 8. As such an adhesive, there may be employed a usual heat sensitive adhesive or pressure sensitive adhesive. As the bonding method, it is possible to employ such a bonding method as a heat sealing method, other than the above mentioned adhesive.

Figure 5:
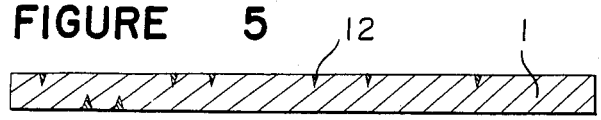
FIG. 5 illustrates in cross section the sequential folding steps to form the tubular casing B of FIG. 6.
Figure 5A:
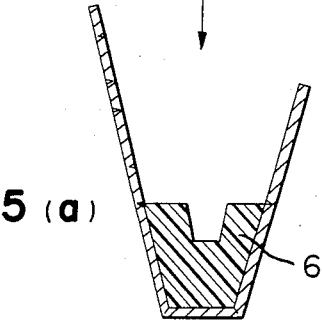
Figure 5B:
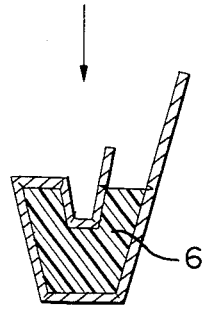
Figure 5C:
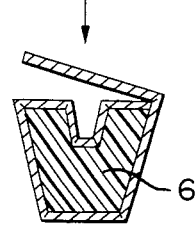
Figure 6:
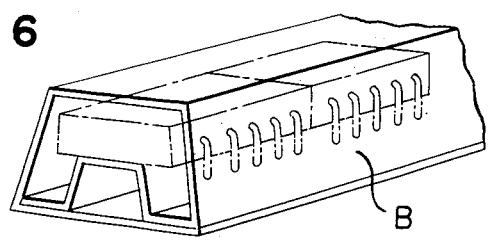
FIG. 6 is a perspective view of a tubular casing prepared by the process of the present invention.

The configuration, etc. of the shaping former or the shaping roll are suitably determined depending upon the particular configuration, etc. of the desired tubular casing. As another embodiment, FIG. 5 illustrates the sequential folding steps by the shaping former 6 to form the tubular casing B of FIG. 6.

The sheet is provided with eight grooves, and the surfactant is applied thereto and dried. The sheet is folded in the sequence of (a), (b) and (c) along the shaping former 6 having a cross-sectional shape of generally trapezoid.

Figure 4:
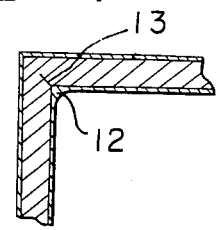
FIG. 4 is an enlarged cross-sectional view of the portion IV of FIG. 3.

In the above folding step, the sheet is folded by the corner portions of the shaping former 6. As shown from the enlarged cross-sectional view of the corner portion IV in FIG. 4, the surfactant 12 remaining in the groove is squeezed out towards the former side by the folding operation of the sheet. The surfactant itself has a lubricating property, whereby lubrication is imparted at the corner portion of the sheet where the folded sheet and the former engage each other with the strongest frictional engagement. Thus, the smooth advance of the sheet is thereby ensured.

The application of the surfactant should be made after the grooves have been provided on the sheet. If this sequence is reversed, the above mentioned effects can not be adequately obtained, since the surfactant at the grooves will then be removed when the grooves are being formed.

The tubular casing thus formed is then taken out without deformation by a plurality of withdrawing rolls 10 such as rubber rolls and forwarded to the subsequent cutting step (not shown) where the tubular casing will be cut into a desired length.

As described in the foregoing, according to the process of the present invention, it is possible to form a tubular casing free from scars or deformation and having an excellent outer appearance and dimensional stability, and it is further possible to increase the production rate of the tubular casing.

I claim:

1. A process for producing a tubular casing by folding a flat plastic sheet (1) into a tubular structure by a shaping former (6) as the sheet advances, and joining the meeting edges of the folded sheet to form the tubular casing, characterized by forming grooves (13) on one or both sides of the sheet along fold lines, coating a surfactant (12) on the sheet surface at least at the fold line portions of the sheet surface which are to be brought into contact with the shaping former, and then folding the sheet into a tubular structure by the shaping former.

2. The process according to claim 1, wherein the coating of the surfactant is conducted by passing the sheet provided with grooves (13) through a solution of a surfactant.

3. The process according to claim 1, wherein the coating of the surfactant is conducted so that the grooves of the sheet are filled with a surfactant.

4. The process according to claim 1, wherein the grooves are provided in a V-form or U-form in cross section with a depth of from 30 to 70% relative to the thickness of the sheet.

5. The process according to claim 4, wherein the thickness of the sheet is from 0.1 to 2 mm.

6. The process according to claim 1, wherein the plastic sheet is made of a thermoplastic material selected from the group consisting of polyvinyl chloride, polystyrene, polypropylene, polycarbonate and polyester.

7. The process according to claim 1, wherein the surfactant is an anionic, cationic, nonionic or amphoteric surfactant which has an antistatic effect.

* * * * *